US010965959B2

(12) United States Patent
Xu et al.

(10) Patent No.: US 10,965,959 B2
(45) Date of Patent: Mar. 30, 2021

(54) MULTI-FRAME QUALITY ENHANCEMENT FOR COMPRESSED VIDEO

(71) Applicant: BEIHANG UNIVERSITY, Beijing (CN)

(72) Inventors: Mai Xu, Beijing (CN); Ren Yang, Beijing (CN); Tie Liu, Beijing (CN); Tianyi Li, Beijing (CN); Zhaoji Fang, Beijing (CN)

(73) Assignee: BEIHANG UNIVERSITY, Beijing (CN)

(*) Notice: Subject to any disclaimer, the term of this patent is extended or adjusted under 35 U.S.C. 154(b) by 0 days.

(21) Appl. No.: 16/968,409

(22) PCT Filed: Jan. 28, 2019

(86) PCT No.: PCT/CN2019/073371
§ 371 (c)(1),
(2) Date: Aug. 7, 2020

(87) PCT Pub. No.: WO2019/154152
PCT Pub. Date: Aug. 15, 2019

(65) Prior Publication Data
US 2020/0404340 A1 Dec. 24, 2020

(30) Foreign Application Priority Data
Feb. 8, 2018 (CN) .......................... 201810125244.0

(51) Int. Cl.
*H04N 5/93* (2006.01)
*H04N 19/86* (2014.01)
(Continued)

(52) U.S. Cl.
CPC ......... *H04N 19/86* (2014.11); *G06K 9/00744* (2013.01); *G06K 9/6256* (2013.01);
(Continued)

(58) Field of Classification Search
CPC ...... H04N 19/86; H04N 19/51; H04N 19/154; H04N 9/87; H04N 19/172; G06K 9/6256; G06K 9/00744
See application file for complete search history.

(56) References Cited

U.S. PATENT DOCUMENTS 9,514,502 B2 * 12/2016 Ghosh ................ G06K 9/00744
9,836,484 B1 * 12/2017 Bialynicka-Birula ......................
H04N 5/23219
(Continued)

FOREIGN PATENT DOCUMENTS

CN 101980538 A 2/2011
CN 102098501 A 6/2011
(Continued)

OTHER PUBLICATIONS

National Intellectual Property Administration, PRC (ISA/CN), International Search Report for International Application No. PCT/CN2019/073371, dated Apr. 1, 2019, 6 pages (including English translation).
(Continued)

*Primary Examiner* — Howard D Brown, Jr.
(74) *Attorney, Agent, or Firm* — MagStone Law LLP (57) ABSTRACT

The present application provides a multi-frame quality enhancement method and device for a lossily compressed video. The method comprises: performing quality enhancement on the i-th frame of a decompressed video stream using m frames correlated with the i-th frame to play the i-th frame with enhanced quality. The m frames are frames in the video stream. The number of the same pixels or corresponding pixels of each of the m frames and the i-th frame is greater than a preset threshold. m is a natural number greater than 1. In an implementation, a non-peak-quality frame positioned between two peak quality frames may be enhanced using the peak quality frames. The method may mitigate the
(Continued)

quality fluctuation across a plurality of frames for providing playback of the video stream and may improve the quality of all frames in the video after the lossy compression.

20 Claims, 3 Drawing Sheets

(51) Int. Cl.
| | |
|---|---|
| H04N 9/87 | (2006.01) |
| G06K 9/00 | (2006.01) |
| H04N 19/154 | (2014.01) |
| H04N 19/51 | (2014.01) |
| H04N 19/172 | (2014.01) |
| G06K 9/62 | (2006.01) |

(52) U.S. Cl.
CPC ............. *H04N 9/87* (2013.01); *H04N 19/154* (2014.11); *H04N 19/172* (2014.11); *H04N 19/51* (2014.11)

(56) References Cited

U.S. PATENT DOCUMENTS

| | | | | |
|---|---|---|---|---|
| 9,836,819 | B1* | 12/2017 | Donsbach | G06K 9/00228 |
| 9,838,641 | B1* | 12/2017 | Lim | H04N 5/23241 |
| 10,372,991 | B1* | 8/2019 | Niemasik | G06K 9/00288 |
| 2016/0210716 | A1* | 7/2016 | Ghosh | G06K 9/4642 |
| 2018/0196587 | A1* | 7/2018 | Bialynicka-Birula | ........................ G06T 3/0093 |

FOREIGN PATENT DOCUMENTS

| | | |
|---|---|---|
| CN | 103888777 A | 6/2014 |
| CN | 107197260 A | 9/2017 |
| CN | 107481209 A | 12/2017 |

OTHER PUBLICATIONS

National Intellectual Property Administration, PRC (ISA/CN), Written Opinion of the International Searching Authority for International Application No. PCT/CN2019/073371, dated Apr. 1, 2019, 8 pages (including English translation).

\* cited by examiner

Fig. 1

| Identifying peak quality frames and non-peak-quality frames in a video stream using a trained support vector machine (SVM) | 201 |

↓

| Using a peak quality frame p preceding an n-th frame and a peak quality frame q subsequent to the n-th frame to perform quality enhancement on the n-th frame when the n-th frame is an non-peak-quality frame | 202 |

| Convolutional layer | 1/2/3 | 4/5 | 6/7 | 8 | 9 |
|---|---|---|---|---|---|
| Size of convolution kernel | 9 x 9 | 7 x 7 | 3 x 3 | 1 x 1 | 5 x 5 |
| Number of convolutional kernels | 128 | 64 | 64 | 32 | 1 |
| Step length | 1 | 1 | 1 | 1 | 1 |
| Activation function | PReLU | PReLU | PReLU | PReLU | ——— |

MULTI-FRAME QUALITY ENHANCEMENT FOR COMPRESSED VIDEO

CROSS-REFERENCE TO RELATED APPLICATIONS

This application is a national phase application of International Application No. PCT/CN2019/073371 filed on Jan. 28, 2019, which is hereby incorporated by reference in its entirety.

This application claims priority to Chinese Patent Application No. 2018101252440 filed at the Chinese Patent Office on Feb. 8, 2018, entitled "Multi-frame Quality Enhancement Method and Device for Lossily compressed Video," which is hereby incorporated by reference in its entirety.

TECHNICAL FIELD

The present application relates to the technical field of image processing, and more particularly, to methods and apparatuses for multi-frame quality enhancement for lossily compressed video.

BACKGROUND

In the past few decades, video has become significantly popular on the Internet. According to the Cisco Data Traffic Forecasts, video traffic accounted for 60% of the Internet traffic in 2016, and this number will be expected to reach 78% by 2020. When transmitting video over the bandwidth-limited Internet, video compression must be applied to save the coding bit-rate. However, the compressed video inevitably suffers from compression artifacts, such as, blocking effects, ringing effects, and blurring, which may severely degrade the Quality of Experience (QoE). Therefore, it is necessary to research on quality enhancement for compressed video.

Recently, methods for improving the visual quality of compressed images or videos have been continuously proposed. For example, Dong et al. designed a four-layer convolutional neural network (CNN) called AR-CNN, which greatly improved the quality of JPEG images. Later, Yang et al. designed a decoder-side hierarchical convolutional neural network (DS-CNN) to improve the video quality. The DS-CNN consists of two subnets, designed to reduce intra-frame and inter-frame coding distortions.

However, when performing quality enhancement on a current frame, existing quality enhancement approaches do not use any information of the current frame's neighboring frames, and their performance is thus largely limited.

SUMMARY

In view of the problems in the related art, the present application provides methods and apparatuses for multi-frame quality enhancement for lossily compressed video. Information of adjacent frames can be reasonably combined in decompression of any frame in the quality enhancement method, thereby improving the playback quality of the current frame.

In a first aspect, the present application provides a method for multi-frame quality enhancement for lossily compressed video, including:

using m frames correlated with an i-th frame of a lossily compressed video stream to perform quality enhancement on the i-th frame to provide playback of the i-th frame with enhanced quality.

The m frames belong to the video stream. The number of the same pixels or corresponding pixels of each of the m frames and the i-th frame is greater than a preset threshold. m is a natural number greater than 1.

Optionally, the step of using m frames correlated with an i-th frame of the lossily compressed video stream to perform quality enhancement on the i-th frame includes:

identifying peak quality frames and non-peak-quality frames in the video stream;

designating the i-th frame as $F_{np}$ when the i-th frame is a non-peak-quality frame; and using a peak quality frame $F_{p1}$ preceding the non-peak-quality frame, i.e., the i-th frame $F_{np}$, and a peak quality frame $F_{p2}$ subsequent to the i-th frame to perform quality enhancement on the non-peak-quality frame, i.e., the i-th frame $F_{np}$.

Optionally, the step of identifying peak quality frames and non-peak-quality frames in the video stream may include:

identifying peak quality frames and non-peak-quality frames in the video stream using a trained support vector machine (SVM).

For example, the SVM may use a spatial domain no-reference image quality evaluation method to extract 36 pixel distribution features from each frame and extract 180 features in total of a total of 5 frames, i.e., two frames preceding a certain frame, two frames subsequent to the frame, and the frame, so as to determine whether the frame is a peak quality frame.

Optionally, the method may further include: providing a plurality of training videos, each frame in each training video being a training sample;

performing lossy compression on all of the training videos, and calculating a peak signal-to-noise ratio of each frame in each training video with respect to each frame in a training video not subject to lossy compression;

determining whether each frame in each training video is a peak quality frame according to the peak signal-to-noise ratio corresponding to each frame, and extracting 36 pixel distribution features of each frame in each training video; and using the pixel distribution features of an i-th frame in each training video and adjacent frames as training features of an i-th training sample, taking the condition that whether the i-th frame is a peak quality frame as a training label of the i-th training sample, and training the SVM using the features and the labels of all of the training samples.

Optionally, the step of using a peak quality frame $F_{p1}$ preceding the non-peak-quality frame $F_{np}$ and a peak quality frame $F_{p2}$ subsequent to the i-th frame to perform quality enhancement on the i-th frame $F_{np}$ includes:

inputting the non-peak-quality frame, i.e., the i-th frame $F_{np}$, the peak quality frame $F_{p1}$, and the peak quality frame $F_{p2}$ into a multi-frame convolutional neural network structure, performing motion compensation on the peak quality frames $F_{p1}$ and $F_{p2}$ using a motion compensation subnet of the multi-frame convolutional neural network structure to obtain compensated peak quality frames $F'_{p1}$ and $F'_{p2}$, using a quality enhancement subnet of the multi-frame convolutional neural network structure to perform quality enhancement on the non-peak-quality frame, i.e., the i-th frame $F_{np}$, and finally, designating the non-peak-quality frame, i.e., the i-th frame with enhanced quality that is output by the quality enhancement subnet, as $F_{np}+R_{np}(\theta_{qe})$, wherein $F_{np}(\theta_{qe})$ represents a residual reconstructed according to a trainable parameter $\theta_{qe}$, and the output non-peak-quality frame. That is, the i-th frame after quality enhancement is $F_{np}+R_{np}(\theta_{qe})$.

Optionally, the multi-frame convolutional neural network structure may include: the motion compensation subnet configured to compensate temporal motion between adjacent frames, and the quality enhancement subnet configured to fuse the features of the frames subject to temporal motion compensation in the motion compensation subnet.

Optionally, before inputting the non-peak-quality frame, i.e., the i-th frame $F_{np}$, the peak quality frame $F_{p1}$ and the peak quality frame $F_{p2}$ into the multi-frame convolutional neural network structure to acquire the output non-peak-quality frame, i.e., the i-th frame after quality enhancement $F_{np}+F_{np}(\theta_{qe})$, the method further includes:

training the motion compensation subnet and the quality enhancement subnet of the multi-frame convolutional neural network structure.

Optionally, if the peak signal-to-noise ratio PSNR of the i-th frame in a lossily compressed video stream with respect to the i-th frame in a lossless compressed video stream is greater than the peak signal-to-noise ratio of the (i−1)-th frame in the lossily compressed video stream with respect to the (i−1)-th frame in the lossless compressed video stream and greater than the peak signal-to-noise ratio of the (i+1)-th frame in the lossily compressed video stream with respect to the (i+1)-th frame in the lossless compressed video stream, the i-th frame in the lossily compressed video stream is a peak quality frame, and video frames in the lossily compressed video stream that are not the peak quality frames are called non-peak-quality frames.

In a second aspect, the present application also provides an apparatus for multi-frame quality enhancement for lossily compressed video, including: a memory, a processor, a bus and a computer program stored on the memory and running on the processor. The processor implements any one of the methods in the first aspect when executing the program.

In a third aspect, the present application also provides a computer storage medium storing a computer program. The program, when executed by a processor, implements any one of methods in the first aspect.

The present application has the beneficial effects.

The method of the present application analyzes inter-frame quality fluctuations of video sequences compressed according to various video coding standards, and performs quality enhancement on a non-peak-quality frame by using adjacent peak quality frames, so that watched video streams are higher in quality.

DETAILED DESCRIPTION OF THE EMBODIMENTS

To facilitate better explanation and understanding of the present application, the present application is described in detail below through optional implementation modes in combination with accompanying drawings.

The present application provides a method for multi-frame quality enhancement for lossily compressed video, including: using m frames correlated with the i-th frame of a lossily compressed video stream to perform quality enhancement on the i-th frame for playback of the i-th frame with enhanced quality.

Particularly, the m frames belong to the video stream, and the number of the same pixels or corresponding pixels of each respective frame of the m frames and the i-th frame $F_{np}$ is greater than a preset threshold, where m is a natural number greater than 1.

Optionally, in an implementation, the step of performing quality enhancement on the i-th frame using m frames correlated with the i-th frame of a lossily compressed video stream may include:

identifying peak quality frames and non-peak-quality frames in the video stream; and when the i-th frame $F_{np}$ is a non-peak-quality frame, performing quality enhancement on the non-peak-quality frame $F_{np}$ using a peak quality frame $F_{p1}$ that is a previous frame of the non-peak-quality frame $F_{np}$ and a peak quality frame $F_{p2}$ that is a subsequent frame of the i-th frame $F_{np}$.

The method of the present embodiment may analyze inter-frame quality fluctuations of video sequences compressed according to various video coding standards and may perform quality enhancement on a non-peak-quality frame using adjacent peak quality frames to enhance the quality of the video streams for playback.

Figure 2:
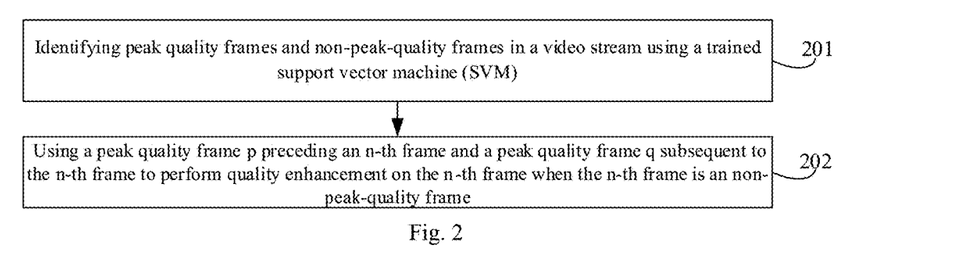
FIG. 2 is a flow diagram illustrating a multi-frame quality enhancement method for lossily compressed video provided by an embodiment of the present application.

In an optional implementation, as shown in FIG. 2, the method of the present embodiment may include the following steps:

201, identifying peak quality frames and non-peak-quality frames in the video stream using a trained support vector machine (SVM).

For example, a plurality of training videos may be used, and each frame in each training video is a training sample. First, lossy compression may be performed on the training videos and a peak signal-to-noise ratio of each frame in each compressed training video is calculated with respect to a frame in the training video that is not lossily compressed.

Secondly, whether each frame in each training video is a peak quality frame is determined according to the peak signal-to-noise ratio corresponding to the frame, wherein the peak quality frame is identified by 1, and the non-peak-quality frame is identified by 0.

36 pixel distribution features are then extracted from each frame in each training video, and the pixel distribution features (i.e., (j+k+1)*36 features in total) of the i-th frame in each training video and its neighboring frames (i.e., from the (i−j)-th frame to the (i+k)-th frame) are used as training features of the i-th training sample. A training label of the i-th training sample indicates whether the i-th frame is a peak quality frame (i.e., "0" or "1"). The SVM is trained using the features and the labels of all of the training samples.

The trained SVM may use a no-reference image quality assessment method in the spatial domain to extract 36 pixel value distribution features from each frame and extract 180 features in a total of 5 frames, i.e., two previous frames preceding a certain frame, two subsequent frames, and the frame, to determine whether the frame is a peak quality frame.

It should be noted that the trained SVM may also use other methods to identify the peak quality frames. It is not limited by the embodiments, and the SVM can use other methods according to actual needs.

For example, if the peak signal-to-noise ratio PSNR of the i-th frame in a lossily compressed video stream with respect to the i-th frame in a lossless compressed video stream is greater than the peak signal-to-noise ratio of the (i−1)-th frame in the lossily compressed video stream to the (i−1)-th frame in the lossless compressed video stream and greater than the peak signal-to-noise ratio of the (i+1)-th frame in the lossily compressed video stream to the (i+1)-th frame in the lossless compressed video stream, the i-th frame in the lossily compressed video stream is regarded as being a peak quality frame. Video frames in the lossily compressed video stream that are not the determined peak quality frames are regarded as being non-peak-quality frames.

202, when the i-th frame $F_{np}$ is a non-peak-quality frame, perform quality enhancement on the non-peak-quality frame $F_{np}$ using a peak quality frame $F_{p1}$ preceding the non-peak-quality frame $F_{np}$ and a peak quality frame $F_{p2}$ subsequent to the i-th frame.

For example, the non-peak-quality frame $F_{np}$, the peak quality frame $F_{p1}$, and the peak quality frame $F_{p2}$ may be input into a multi-frame convolutional neural network structure. Motion compensation may be performed on the peak quality frames $F_{p1}$ and $F_{p2}$ using a motion compensation subnet in the multi-frame convolutional neural network structure to obtain compensated peak quality frames $F'_{p1}$ and $F'_{p2}$. Quality enhancement may be performed on the non-peak-quality frame $F_{np}$ using a quality enhancement subnet in the multi-frame convolutional neural network structure. Finally, the non-peak-quality frame, i.e., the i-th frame after quality enhancement output by the quality enhancement subnet, may be designated as $F_{np}+R_{np}(\theta_{qe})$, wherein $R_{np}(\theta_{qe})$ represents a residual reconstructed according to a trainable parameter $\theta_{qe}$, and the output non-peak-quality frame, i.e., the i-th frame after quality enhancement is $F_{np}+R_{np}(\theta_{qe})$.

In the present embodiment, the multi-frame convolutional neural network structure includes: the motion compensation subnet configured to compensate temporal motion between neighboring frames and the quality enhancement subnet configured to fuse the features of the frames that have been motion compensated by the motion compensation subnet.

Before the multi-frame convolutional neural network structure is used, the motion compensation subnet and the quality enhancement subnet in the multi-frame convolutional neural network structure may be trained.

Figure 4:
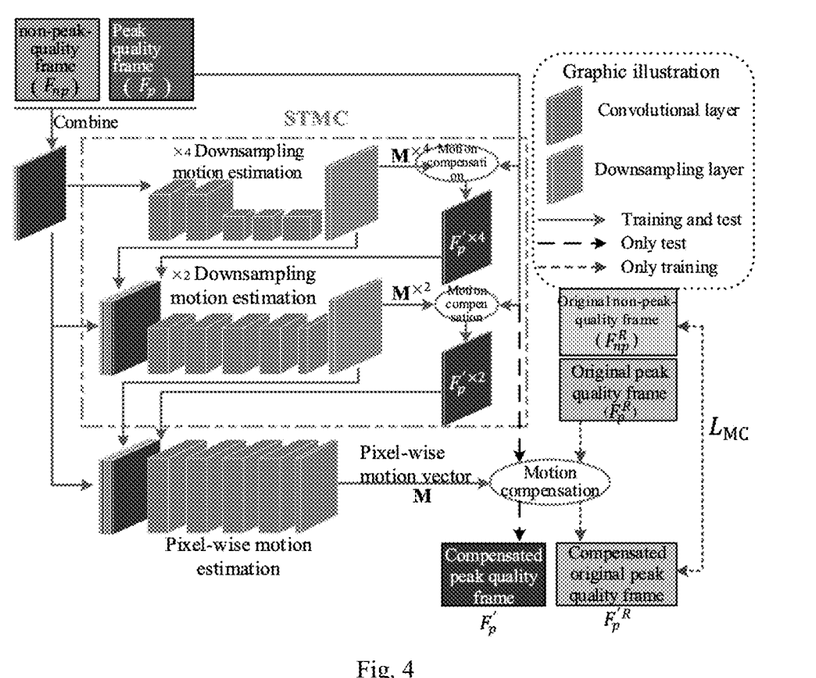
FIG. 4 is a schematic diagram of a motion compensation subnet in accordance with an embodiment of the present application.

FIG. 4 illustrates a schematic diagram of a motion compensation subnet. As shown in FIG. 4, the peak quality frame $F_{p1}$ to be compensated and the non-peak-quality frame $F_{np}$ may be directly input into the motion compensation subnet, and a compensated peak quality frame $F'_{p1}$ may then be output. Similarly, the peak quality frame $F_{p2}$ to be compensated and the i-th frame may be directly input into the motion compensation subnet, and a compensated peak quality frame $F'_{p2}$ may then be output.

In the motion compensation subnet illustrated in FIG. 4, the bottommost line represents pixel-wise motion estimation, which is pixel-wise motion estimation and may be regarded as a part of the motion compensation subnet. A final output result is the compensated peak quality frame $F'_{p1}$.

To facilitate better understanding of the solution of the alternative embodiment, partial content is explained.

Figure 1:
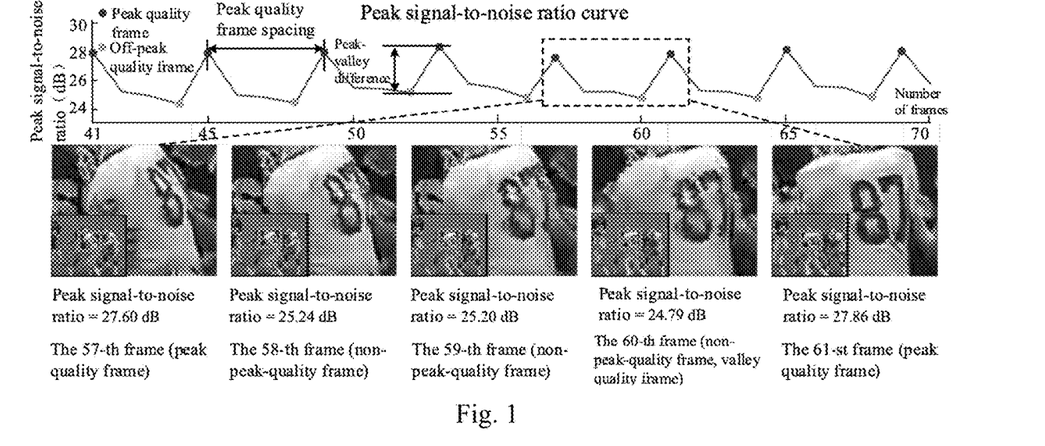
FIG. 1 is a schematic diagram illustrating fluctuations of image quality across frames in a decompressed video stream.

As shown in FIG. 1, heavy quality fluctuation may exist across the frames of a decompressed video. For example, the non-peak-quality frames shown in FIG. 1, such as the 58-th frame and the 59-th frame, may have relatively low image quality. Thus, to improve the non-peak-quality frames, the peak quality frames may be used to improve the quality of the adjacent non-peak-quality frames in the optional embodiments. This can be regarded as multi-frame quality enhancement, which is similar to multi-frame super-resolution.

A multi-frame quality enhancement method for a lossily compressed video is provided for a compressed video in the embodiments. As shown in FIG. 1, there exists large quality fluctuation across frames in video sequences compressed by almost all coding standards. Accordingly, the identified peak quality frames may be used to improve the quality of the adjacent non-peak-quality frames.

Optionally, SVM (support vector machine) training may achieve a no-reference method to detect the peak quality frames.

Then, a novel multi-frame convolutional neural network structure improves the quality. The current frame and the peak quality frames adjacent to the current frame are all used as inputs.

Figure 5:
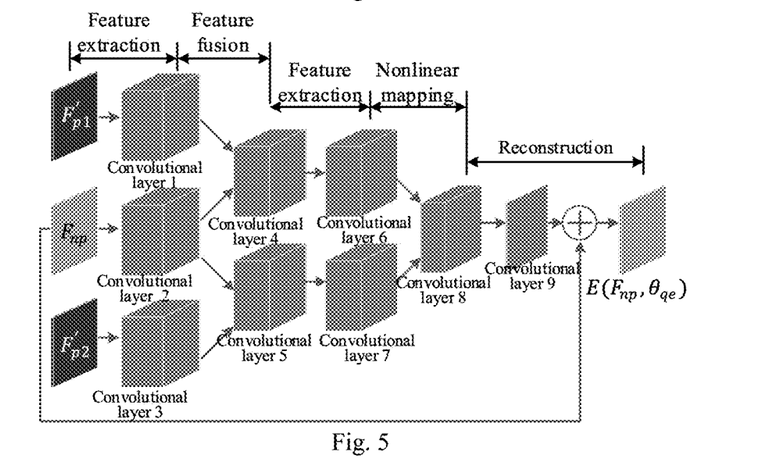
FIG. 5 is a schematic diagram of a quality enhancement subnet in accordance with an embodiment of the present application.

The multi-frame convolutional neural network structure in the embodiments may include two subnets, i.e., a motion compensation subnet (as shown in FIG. 4) and a quality enhancement subnet (as shown in FIG. 5).

The motion compensation subnet may compensate the previous motion of the current non-peak-quality frame and the peak quality frames adjacent to the current non-peak-quality frame.

The quality enhancement subnet may output a current non-peak-quality frame with enhanced quality using inputs including the current non-peak-quality frame and the compensated peak quality frames. For example, features may be extracted from the current non-peak-quality frame and the compensated peak quality frames and may then be fused to enhance the quality of the current frame.

This is to improve the quality of the current non-peak-quality frame by virtue of the adjacent peak quality frames.

For example, as shown in FIG. 1, the current non-peak-quality frame (the 59-th frame) and the closest peak quality frames (the 57-th frame and the 61-st frame) are input into the multi-frame convolutional neural network structure of the method of the present embodiment. As a result, high-quality content (such as the reference number 87) of the peak quality frames (the 57-th frame and the 61-st frame) may be used to enhance the non-peak-quality frame. If low-quality content (such as the reference number 87) of the non-peak-quality frame (the 59-th frame) can be obviously enhanced (a schematic diagram after the enhancement is not shown), the quality of the non-peak-quality frame is improved.

Therefore, the present embodiment analyzes inter-frame quality fluctuations of video sequences compressed according to various video coding standards, may mitigate the compression distortion of the non-peak-quality frame by using the adjacent peak quality frames, and improves the playback quality of the non-peak-quality frames.

For the Multi-Frame Convolutional Neural Network Structure

Figure 3:
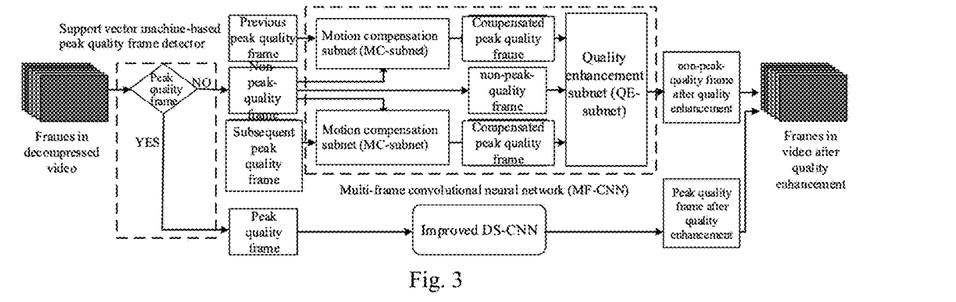
FIG. 3 is a schematic diagram illustrating that the method of FIG. 2 provided by the embodiment of the present application using a multi-frame convolutional neural network structure.

FIG. 3 shows a framework of the multi-frame convolutional neural network structure used in the method of the present application. In the method of the present embodiment, firstly, the peak quality frames are detected to improve the quality of the non-peak-quality frames. In an implementation of the quality enhancement method, an original lossless video cannot be obtained, so that the peak quality frames and the non-peak-quality frames cannot be distinguished by comparison with the lossless video. Therefore, a no-reference peak quality frame detector is provided in the present embodiment.

The multi-frame convolutional neural network structure uses the nearest peak quality frames (quality frames preceding and subsequent to the current non-peak-quality frame) to enhance the current non-peak-quality frame.

The multi-frame convolutional neural network structure may include a motion compensation subnet and a quality enhancement subnet.

The motion compensation subnet may compensate temporal motion between adjacent frames. Optionally, the motion compensation subnet may first predict the temporal motion between the current non-peak-quality frame and the peak quality frames closest to the current non-peak-quality frame. Then, motion compensation is performed on two closest peak quality frames according to estimated motion. In this way, the temporal motion between the non-peak-quality frame and the peak quality frames can be compensated.

The temporal motion described above may involve predicting changes of positions in an XY direction and moving each point of a peak quality frame in x and y directions to obtain a motion-compensated peak quality frame.

Finally, in the quality enhancement subnet, the current non-peak-quality frame $F_{np}$, the closest motion-compensated peak quality frame $F'_{p1}$ preceding the current frame and the closest motion-compensated peak quality frame $F'_{p2}$ subsequent to the current frame are used as inputs (i.e., a total of three frames are inputs), so that the quality of the current non-peak-quality frame can be improved by using the closest peak quality frames.

SVM-Based Peak Quality Frame Detector

In the application, an SVM classifier may perform no-reference peak quality frame detection through training. With reference to the above description, the peak quality frame is a frame having higher quality than its adjacent frames. Therefore, the features of the current frame and four adjacent frames are used to detect the peak quality frames. The peak quality frame detector may use a no-reference quality evaluation method and may extract 36 spatial features from the current frame. Each of the spatial features may be one-dimensional. Besides, the spatial features of this type may be extracted from two previous frames and two subsequent frames of the current frame. Therefore, 180 one-dimensional features may be obtained using the SVM classifier to predict whether the current frame is a peak quality frame or a non-peak-quality frame.

That is, a method for extracting 36 spatial features from each frame is an existing method, which is used in this application and not particularly improved. The 36 spatial features in the present embodiment may be pixel value distribution features.

In addition, a total of (j+k+1)*36 features of the current frame that is to be detected and several adjacent frames (not limited to four frames or five frames, it should be (j+k+1) frames in total) are used to train the SVM classifier to detect the peak quality frames and the non-peak-quality frames.

That is, 36 pixel distribution features of each frame in each training video are extracted. The pixel distribution features (i.e., (j+k+1)*36 features in total) of the i-th frame in each training video and its adjacent frames (i.e., from the (i−j)-th frame to the (i+k)-th frame) are used as training features of the i-th training sample. A training label of the i-th training sample may indicate whether the i-th frame is a peak quality frame (i.e., "0" or "1"). The SVM is trained using the features and the labels of all of the training samples.

Motion Compensation Subnet

After the peak quality frames are detected, the quality of the non-peak-quality frames can be enhanced using the adjacent peak quality frames. However, temporal motion may exist across the non-peak-quality frames and the peak quality frames. Therefore, the motion compensation subnet is used to compensate cross-frame temporal motion.

The architecture and training strategy of the motion compensation subnet are described in detail below.

The Architecture of the Motion Compensation Subnet

As shown in FIG. 4, a spatial transformation motion compensation method uses convolutional layers to estimate ×4 and ×2 scaled-down motion vector maps, which are designated as M×4 and M×2. In M×4 and M×2, scaling down is realized by using some convolutional layers with steps of 2. The scaled-down motion evaluation is effective to processing of large-scale motion. However, due to the scaling down, the accuracy of motion vector evaluation will be reduced.

Accordingly, in addition to the STMC, some convolutional layers are developed in the motion compensation subnet for performing pixel-wise motion estimation, which do not include any scaling down process. The convolutional layers for pixel-wise motion estimation are shown in Table 2. As shown in FIG. 4, the outputs of the STMC may include a ×2 scaled-down motion vector map M×2 and a corresponding compensated peak quality frame $F'_p×2$. The outputs may be combined with the original peak quality frames and non-peak-quality frames to form an input to the convolutional layers for pixel-wise motion estimation. A pixel-wise motion vector map can then be generated, and is denoted as M.

It is noted that the motion vector map M includes two channels, i.e., a transverse motion vector map Mx and a longitudinal motion vector map My. x and y are the horizontal and vertical index of each pixel. Given Mx and My, the peak quality frames are warped to compensate the motion. The compressed peak quality frame and non-peak-quality frame are set as $F_p$ and $F_{np}$, respectively. The compensated peak quality frame $F'_p$ can be expressed as:

$$F'_p(x,y)=I\{F_p(x+M_x(x,y),y+M_y(x,y))\}$$

If $I\{\bullet\}$ represents a bilinear interpolation. The bilinear interpolation is used because $M_x(x, y)$ and $My(x, y)$ may be non-integer values.

The Training Strategy of the Motion Compensation Subnet

Since it is very hard to obtain the ground truth of a motion vector, the parameters related to motion evaluation of the convolutional layers cannot be obtained through direct training. Super-resolution work trains the parameters by minimizing the mean square error (MSE) between the compensated adjacent frames and the current frame.

In the motion compensation subnet, the input $F_p$ and the input $F_{np}$ are both compressed frames with quality distortion. Hence, when the MSE between F'$_p$ and F$_{np}$ is minimized, the motion compensation subnet may be trained by a distorted motion vector, which may result in inaccurate motion estimation.

Therefore, the motion compensation subnet is trained under the supervision of original images. That is, performing motion compensation on a lossless peak quality frame F$_p^R$ using a motion vector map output by the conventional layers of motion estimation and minimizing the MSE between the compensated lossless peak quality frame F$_p^R$ and a lossless non-peak-quality frame F$_{np}^R$. A loss function of the motion compensation subnet may be written by $$L_{MC}(\theta_{mc}) = \|F_p'^R(\theta_{mc}) - F_{np}^R\|_2^2$$

In the formula, $\theta_{mc}$ represents a trainable parameter of the motion compensation subnet. It is noted that the original image F$_{np}^R$ and the original image F$_p^R$ are not required in a test but are required during training.

Quality Enhancement Subnet

The quality enhancement subnet is designed using a spatio-temporal structure, so that the quality of the non-peak-quality frames can be enhanced when the compensated peak quality frames (PQF) are given. Optionally, inputs of the quality enhancement subnet may include the current processed non-peak-quality frame F$_{np}$, and the compensated previous and next peak quality frames (represented by F'$_{p1}$ and F'$_{p2}$, respectively). In this way, the spatial features and the temporal features of the three images are all detected and combined. Therefore, advantageous information in the adjacent peak quality frames can be used to enhance the quality of the non-peak-quality frames. This method differs from a single-frame quality enhancement method based on a convolutional neural network since the single-frame quality enhancement method only uses intra-frame spatial information.

Figure 6:
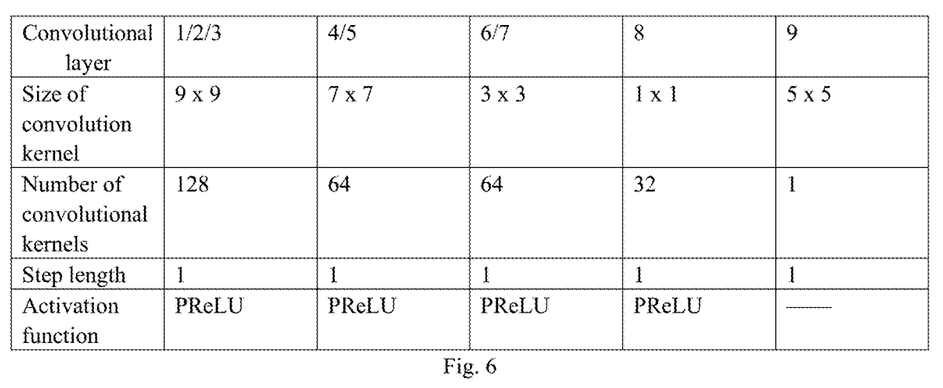
FIG. 6 is a table schematic diagram illustrating convolutional layer information of a quality enhancement subnet provided by an embodiment of the present application.

The architecture of the quality enhancement subnet is shown in FIG. 5. Information of convolutional layers is presented in the table shown in FIG. 6. In the quality enhancement subnet, the convolutional layers Conv 1, 2, and 3 extract the spatial features of input frames F'$_{p1}$, F$_{np}$ and F'$_{p2}$, respectively. Then, in order to use the high-quality information of F'$_{p1}$, Conv 4 may combine the features of F$_{np}$ and F'$_{p1}$. That is, the outputs of Conv 1 and 2 may be combined and then convolved by Conv 4. Similarly, Conv 5 may combine the features of F$_{np}$ and F'$_{p2}$. Conv 6/7 may extract more complex features from Conv 4/5. Therefore, the extracted features of Conv 6 and Conv 7 are non-linearly mapped to another space through Conv 8. Finally, Conv 9 uses the features of Conv 8 to reconstruct F$_{np}$.

Furthermore, the quality enhancement subnet implements quick combination by using residual learning. Optionally, Conv 9 may learn and reconstruct a residual between an original image and a compressed image. Accordingly, the non-peak-quality frame F$_{np}$ may be enhanced by adding the reconstructed residual to the non-peak-quality frame. This process may be expressed as F$_{np}$+R$_{np}(\theta_{qe})$, where R$_{np}(\theta_{qe})$ represents a reconstructed residual generated based on a trainable parameter $\theta_{qe}$.

The motion compensation subnet and the quality enhancement subnet in the multi-frame convolutional neural network may be trained jointly in an end-to-end manner. F$_{p1}^R$ and F'$_{p2}^R$ may represent a peak quality frame (PQF) preceding the original frame and a PQF subsequent to the original frame, respectively. A loss function of the MF-CNN can be expressed as:

$$L_{MF}(\theta_{mc}, \theta_{qe}) = a \cdot \underbrace{\sum_{i=1}^{2} \|F_{pi}'^R(\theta_{mc}) - F_{np}^R\|_2^2}_{L_{MC}} + \underbrace{b \cdot \|F_{np} + R_{np}(\theta_{qe}) - F_{np}^R\|_2^2}_{L_{QE}}$$

As indicated in the above formula, the loss function of the MF-CNN is a weighted sum of L$_{MC}$ and L$_{QE}$, i.e., a weighted sum of a loss function the motion compensation subnet and a loss function of the quality enhancement subnet. Since F'$_{p1}$ and F'$_{p2}$ generated by the motion compensation subnet are the basis of the quality enhancement subnet, a>>b are set at the beginning of the training. After the convergence of L$_{MC}$ is observed, a<<b is set to continue the training. As a result, the quality of the non-peak-quality frame F$_{np}$ is enhanced by using the high-quality information in its adjacent peak quality frames.

Thus, if the i-th frame is the non-peak-quality frame, it is designated as F$_{np}$. The peak quality frame preceding this frame is designated as F$_{p1}$, and the peak quality frame subsequent to this frame is designated as F$_{p2}$. The motion compensation subnet in the multi-frame convolutional neural network structure is used to perform motion compensation on the two peak quality frames F$_{p1}$ and F$_{p2}$ to obtain the compensated peak quality frames F'$_{p1}$ and F'$_{p2}$. Finally, the non-peak-quality frame with enhanced quality is output by the quality enhancement subnet of the multi-frame convolutional neural network structure as F$_{np}$+R$_{np}(\theta_{qe})$, wherein R$_{np}(\theta_{qe})$ represents a residual reconstructed according to a trainable parameter $\theta_{qe}$. The quality of the non-peak-quality frame F$_{np}$ is enhanced by the high-quality information in the adjacent peak quality frames.

Figure 7:
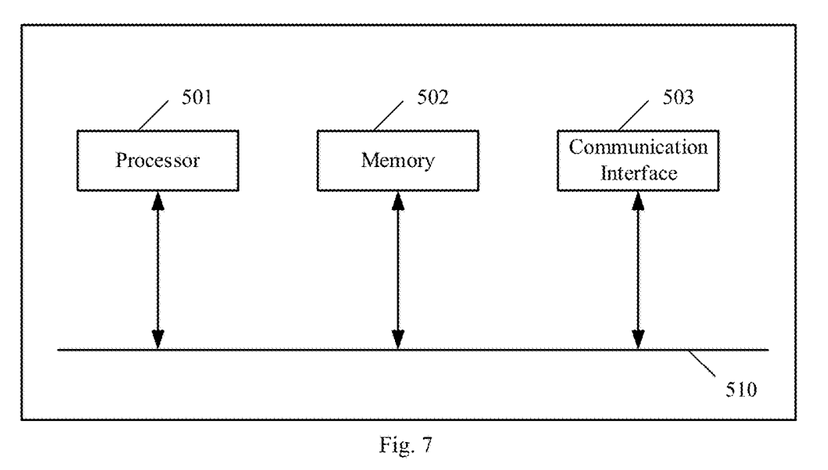
FIG. 7 is a schematic diagram illustrating a structure of an apparatus for multi-frame quality enhancement for lossily compressed video in accordance with an embodiment of the present application.

Furthermore, the method for multi-frame quality enhancement method for lossily compressed video of the embodiments, which is described in combination with FIG. 2, can be implemented using a n apparatus for multi-frame quality enhancement for a lossily compressed video shown in FIG. 7.

The multi-frame quality enhancement device for the lossily compressed video may include a processor 501 and a memory 502 storing a computer program instruction.

Optionally, the processor 501 may include a central processing unit (CPU), or an application specific integrated circuit (ASIC), or may be configured as one or more integrated circuits that implement the alternative embodiments.

The memory 502 may include a large-capacity memory for storing data or instructions. By way of example, and not limitation, the memory 502 may include a hard disk drive (HDD), a floppy disk drive, a flash memory, an optical disk, a magneto-optical disk, a magnetic tape, or a universal serial bus (USB) drive or a combination of two or more of these. Where appropriate, the memory 502 may include removable or non-removable (or fixed) media. Where appropriate, the memory 502 may be internal or external to a data processing device. In certain embodiments, the memory 502 is a non-volatile solid-state memory. In certain embodiments, the memory 502 includes a read-only memory (ROM). Where appropriate, the ROM may be a mask programmed ROM, a programmable ROM (PROM), an erasable PROM (EPROM), an electrically erasable PROM (EEPROM), an electrically erasable ROM (EAROM) or a flash memory or a combination of two or more of these.

The processor 501 reads and executes the computer program instructions stored in the memory 502 to implement any one of the multi-frame quality enhancement methods for the lossily compressed video in the foregoing embodiments.

In one example, the multi-frame quality enhancement device for the lossily compressed video may further include a communication interface 503 and a bus 510. As shown in FIG. 7, the processor 501, the memory 502, and the communication interface 503 are connected and complete communication with each other through the bus 510.

The communication interface 503 is mainly configured to implement communication between modules, devices, units, and/or apparatuses in the alternative embodiments.

The bus 510 includes hardware, software, or both, and couples the components of the above device to each other. By way of example and not limitation, the bus may include an accelerated graphics port (AGP) or other graphics bus, an enhanced industry standard architecture (EISA) bus, a front side bus (FSB), a hyper-transport (HT) interconnect bus, an industrial standard architecture (ISA) bus, an unlimited bandwidth interconnect bus, a low pin count (LPC) bus, a memory bus, a micro channel architecture (MCA) bus, a peripheral component interconnect (PCI) bus, a PCI-Express (PCI-X) bus, a serial advanced technology attachment (SATA) bus, a video electronics standards association local (VLB) bus or other suitable buses, or a combination of two or more of these. Where appropriate, the bus 510 may include one or more buses. Although the alternative embodiments describe and illustrate specific buses, this application contemplates any suitable bus or interconnect.

In addition, in combination with multi-frame quality enhancement method for the lossily compressed video in the foregoing embodiments, an alternative embodiment may provide a computer-readable storage medium for implementation. Computer program instructions are stored on the computer-readable storage medium. The computer program instructions, when executed by the processor, implement any method in the foregoing embodiments.

It should be clear that this application is not limited to the specific configurations and processing described above and shown in the figures. For simplicity, a detailed description of known methods is omitted here. In the above embodiments, several optional steps are described and shown as examples. However, the methods and processes of the present application are not limited to the optional steps described and shown. Those skilled in the art can make various changes, modifications and additions, or change orders of the steps after understanding the spirit of the present application.

The functional blocks shown in the structural block diagrams described above can be implemented as hardware, software, firmware, or a combination thereof. When implemented in hardware, it may be, for example, an electronic circuit, an ASIC, appropriate firmware, a plug-in, and a function card. When implemented in software, the elements of the present application are programs or code segments that are used to perform the required tasks. The program or code segment may be stored in a machine-readable medium, or transmitted on a transmission medium or a communication link through a data signal carried in a carrier wave. The "machine-readable medium" may include any medium capable of storing or transmitting information. Examples of the machine-readable media include electronic circuits, semiconductor memory devices, ROMs, flash memories, EROMs, floppy disks, CD-ROMs, optical disks, hard disks, fiber optic media, radio frequency (RF) links, and the like. The code segment can be downloaded via a computer network such as the Internet and an intranet.

It should also be noted that the exemplary embodiments mentioned in this application describe some methods or systems based on a series of steps or devices. However, this application is not limited to the order of the above steps, that is, the steps may be performed in the order mentioned in the embodiments, and may also be performed in an order different from the order in the embodiments, or several steps may be performed at the same time.

It should be finally noted that: the above embodiments are only used to describe the technical solutions of this application, and not intended to limit this application. Although this application has been described in detail with reference to the foregoing embodiments, those ordinarily skilled in the art should understand that they can still modify the technical solutions described in all the foregoing embodiments, or equivalently replace some of the technical features, and these modifications or replacements do not depart the essences of the corresponding technical solutions from the spirit and scope of the technical solutions of all the embodiments of this application.

INDUSTRIAL PRACTICABILITY

According to the multi-frame quality enhancement method and device for the lossily compressed video which are provided by the embodiments of this application, m frames correlated with an i-th frame of a decompressed video are used to perform quality enhancement on the i-th frame to provide playback of the i-th frame with enhanced quality. The m frames are frames of the video stream, the number of the same pixels or corresponding pixels of each of the m frames and the i-th frame is greater than a preset threshold, where m is a natural number greater than 1. In an application, a peak quality frame can be used to enhance a non-peak-quality frame located between two peak quality frames. The method may mitigate the quality fluctuations across a plurality of frames in the video stream playback process and may improve the quality of all frames in the video after the lossy compression.

The invention claimed is:

1. A method of multi-frame quality enhancement for lossily compressed video, comprising:
performing quality enhancement on a current frame of a lossily compressed video stream using a plurality of frames of the lossily compressed video stream that are correlated with the current frame for playback of the current frame with enhanced quality, wherein the number of the same pixels or corresponding pixels of each of the plurality of frames and the current frame is greater than a preset threshold, and wherein performing quality enhancement on the current frame using the plurality of frames correlated with the current frame of the lossily compressed video stream comprises:
identifying peak quality frames and non-peak-quality frames in the lossily compressed video stream;
determining that the current frame is a non-peak-quality frame, and
performing quality enhancement on the current frame using a first peak quality frame $F_{p1}$ and a second peak quality frame $F_{p2}$ of the peak quality frames, wherein the first peak quality frame $F_{p1}$ is a previous frame of the current frame, and wherein the second peak quality frame $F_{p2}$ is a subsequent frame of the current frame.

2. The method according to claim 1, wherein identifying the peak quality frames and the non-peak-quality frames in the lossily compressed video stream comprises:
   identifying the peak quality frames and the non-peak-quality frames in the lossily compressed video stream using a trained support vector machine (SVM).

3. The method according to claim 2, further comprising:
   providing a plurality of training videos, wherein each frame in each of the training videos is a training sample;
   performing lossy compression on the training videos to generate a plurality of compressed training videos, and calculating a peak signal-to-noise ratio for each frame in each of the compressed training videos with respect to a corresponding frame in one of the training videos;
   determining whether each frame in each of the training videos is a peak quality frame based on the peak signal-to-noise ratio corresponding to the frame;
   extracting a plurality of pixel distribution features from each frame in each of the training videos; and
   training the SVM using a plurality of training features and a plurality of labels of the training samples, wherein the training features of an i-th training sample of the training samples comprise the pixel distribution features of the i-th frame in one of the training videos and adjacent frames of the i-th frame, and wherein the i-th training sample is associated with one of the plurality of labels indicating whether the i-th training sample is a peak quality frame.

4. The method according to claim 1, wherein performing quality enhancement on the current frame using the first peak quality frame $F_{p1}$ and the second peak quality frame $F_{p2}$ of the peak quality frames comprises:
   inputting the current frame, the first peak quality frame $F_{p1}$, and the second peak quality frame $F_{p2}$ into a multi-frame convolutional neural network structure,
   performing motion compensation on the first peak quality frame $F_{p1}$ and the second peak quality frame $F_{p2}$ using a motion compensation subnet in the multi-frame convolutional neural network structure to obtain a first compensated peak quality frame $F'_{p1}$ and a second compensated peak quality frame $F'_{p2}$;
   performing quality enhancement on the current frame using a quality enhancement subnet in the multi-frame convolutional neural network structure; and
   outputting, by the quality enhancement subnet, a quality enhanced frame representing the current frame with enhanced quality, wherein the quality enhanced frame is) represented as $F_{np}+R_{np}(\theta_{qe})$, wherein $F_{np}$ represents the current frame, and wherein $R_{np}(\theta_{qe})$ represents a residual reconstructed according to a trainable parameter $\theta_{qe}$.

5. The method according to claim 4, wherein the multi-frame convolutional neural network structure comprises: the motion compensation subnet configured to compensate temporal motion between adjacent frames and the quality enhancement subnet configured to fuse features of temporal-motion-compensated frames produced by the motion compensation subnet.

6. The method according to claim 5, comprising:
   training the motion compensation subnet and the quality enhancement subnet in the multi-frame convolutional neural network structure before inputting the current frame, the first peak quality frame $F_{p1}$, and the second peak quality frame $F_{p2}$ into the multi-frame convolutional neural network structure.

7. The method according to claim 3, wherein determining whether each frame in each of the training videos is a peak quality frame based on the peak signal-to-noise ratio corresponding to the frame comprises:
   in response to determining that a first peak signal-to-noise ratio of a first frame in a first compressed training video of the compressed training videos with respect to a first frame in a first training video of the training videos is greater than a second peak signal-to-noise ratio of a second frame in the first compressed video with respect to a second frame in the first training video and that the first peak signal-to-noise ratio is greater than a third peak signal-to-noise ratio of a third frame in the first compressed video with respect to a third frame in the first training video, determining that the first frame in the first compressed video is a peak quality frame, wherein the second frame is a previous frame of the first frame, and wherein the third frame is a subsequent frame of the first frame; and
   identifying non-peak-quality frames of the training videos in view of a determination that the non-peak-quality frames are not peak quality frames.

8. An apparatus for multi-frame enhancement for lossily compressed video, comprising:
   a memory, and
   a processor communicably coupled to the memory, the processor to:
      perform quality enhancement on a current frame of a lossily compressed video stream using a plurality of frames of the lossily compressed video stream that are correlated with the current frame for playback of the current frame with enhanced quality, wherein the number of the same pixels or corresponding pixels of each of the plurality of frames and the current frame is greater than a preset threshold, and wherein, to perform quality enhancement on the current frame using the plurality of frames correlated with the current frame of the lossily compressed video stream, the processor is further to:
         identify peak quality frames and non-peak-quality frames in the lossily compressed video stream;
         determine that the current frame is a non-peak-quality frame, and
         perform quality enhancement on the current frame using a first peak quality frame $F_{p1}$ and a second peak quality frame $F_{p2}$ of the peak quality frames, wherein the first peak quality frame $F_{p1}$ is a previous frame of the current frame, and wherein the second peak quality frame $F_{p2}$ is a subsequent frame of the current frame.

9. A non-transitory computer storage medium storing a computer program, wherein the program, when executed by a processor, cause the processor to:
   perform quality enhancement on a current frame of a lossily compressed video stream using a plurality of frames of the lossily compressed video stream that are correlated with the current frame for playback of the current frame with enhanced quality, wherein the number of the same pixels or corresponding pixels of each of the plurality of frames and the current frame is greater than a preset threshold, and wherein, to perform quality enhancement on the current frame using the plurality of frames correlated with the current frame of the lossily compressed video stream, the processor is further to:
      identify peak quality frames and non-peak-quality frames in the lossily compressed video stream;

determine that the current frame is a non-peak-quality frame, and perform quality enhancement on the current frame using a first peak quality frame $F_{p1}$ and a second peak quality frame $F_{p2}$ of the peak quality frames, wherein the first peak quality frame $F_{p2}$ is a previous frame of the current frame, and wherein the second peak quality frame $F_{p2}$ is a subsequent frame of the current frame.

10. The apparatus of claim 8, wherein to identify the peak quality frames and the non-peak-quality frames in the lossily compressed video stream, the processor is further to:

identify the peak quality frames and the non-peak-quality frames in the lossily compressed video stream using a trained support vector machine (SVM).

11. The apparatus of claim 8, wherein the processor is further to:

provide a plurality of training videos, wherein each frame in each of the training videos is a training sample;

perform lossy compression on the training videos to generate a plurality of compressed training videos, and calculating a peak signal-to-noise ratio for each frame in each of the compressed training videos with respect to a corresponding frame in one of the training videos;

determine whether each frame in each of the training videos is a peak quality frame based on the peak signal-to-noise ratio corresponding to the frame;

extract a plurality of pixel distribution features from each frame in each of the training videos; and train the SVM using a plurality of training features and a plurality of labels of the training samples, wherein the training features of an i-th training sample of the training samples comprise the pixel distribution features of the i-th frame in one of the training videos and adjacent frames of the i-th frame, and wherein the i-th training sample is associated with one of the plurality of labels indicating whether the i-th training sample is a peak quality frame.

12. The apparatus of claim 8, wherein to perform quality enhancement on the current frame using the first peak quality frame $F_{p1}$ and the second peak quality frame $F_{p2}$ of the peak quality frames, the processor is further to:

input the current frame, the first peak quality frame $F_{p1}$, and the second peak quality frame $F_{p2}$ into a multi-frame convolutional neural network structure, perform motion compensation on the first peak quality frame $F_{p1}$ and the second peak quality frame $F_{p2}$ using a motion compensation subnet in the multi-frame convolutional neural network structure to obtain a first compensated peak quality frame $F'_{p1}$ and a second compensated peak quality frame $F'_{p2}$;

perform quality enhancement on the current frame using a quality enhancement subnet in the multi-frame convolutional neural network structure; and output, by the quality enhancement subnet, a quality enhanced frame representing the current frame with enhanced quality, wherein the quality enhanced frame is represented as $F_{np}+R_{np}(\theta_{qe})$, wherein $F_{np}$ represents the current frame, and wherein $R_{np}(\theta_{qe})$ represents a residual reconstructed according to a trainable parameter.

13. The apparatus of claim 12, wherein the multi-frame convolutional neural network structure comprises: the motion compensation subnet configured to compensate temporal motion between adjacent frames and the quality enhancement subnet configured to fuse features of temporal-motion-compensated frames produced by the motion compensation subnet.

14. The apparatus of claim 13, wherein the processor is further to:

train the motion compensation subnet and the quality enhancement subnet in the multi-frame convolutional neural network structure before inputting the current frame, the first peak quality frame $F_{p1}$, and the second peak quality frame $F_{p2}$ into the multi-frame convolutional neural network structure.

15. The apparatus of claim 11, wherein, to determine whether each frame in each of the training videos is a peak quality frame based on the peak signal-to-noise ratio corresponding to the frame, the processor is further to:

in response to determining that a first peak signal-to-noise ratio of a first frame in a first compressed training video of the compressed training videos with respect to a first frame in a first training video of the training videos is greater than a second peak signal-to-noise ratio of a second frame in the first compressed video with respect to the a second frame in the first training video and that the first peak signal-to-noise ratio is greater than a third peak signal-to-noise ratio of a third frame in the first compressed video with respect to a third frame in the first training video, determine that the first frame in the first compressed video is a peak quality frame, wherein the second frame is a previous frame of the first frame, and wherein the third frame is a subsequent frame of the first frame; and identify non-peak-quality frames of the training videos in view of a determination that the non-peak-quality frames are not peak quality frames.

16. The non-transitory computer storage medium of claim 9, wherein to identify the peak quality frames and the non-peak-quality frames in the lossily compressed video stream, the processor is further to:

identify the peak quality frames and the non-peak-quality frames in the lossily compressed video stream using a trained support vector machine (SVM).

17. The non-transitory computer storage medium of claim 9, wherein the processor is further to:

provide a plurality of training videos, wherein each frame in each of the training videos is a training sample;

perform lossy compression on the training videos to generate a plurality of compressed training videos, and calculating a peak signal-to-noise ratio for each frame in each of the compressed training videos with respect to a corresponding frame in one of the training videos;

determine whether each frame in each of the training videos is a peak quality frame based on the peak signal-to-noise ratio corresponding to the frame;

extract a plurality of pixel distribution features from each frame in each of the training videos; and train the SVM using a plurality of training features and a plurality of labels of the training samples, wherein the training features of an i-th training sample of the training samples comprise the pixel distribution features of the i-th frame in one of the training videos and adjacent frames of the i-th frame, and wherein the i-th training sample is associated with one of the plurality of labels indicating whether the i-th training sample is a peak quality frame.

18. The non-transitory computer storage medium of claim 9, wherein to perform quality enhancement on the current frame using the first peak quality frame $F_{p1}$ and the second peak quality frame $F_{p2}$ of the peak quality frames, the processor is further to:

input the current frame, the first peak quality frame $F_{p1}$, and the second peak quality frame $F_{p2}$ into a multi-frame convolutional neural network structure,     perform motion compensation on the first peak quality frame $F_{p1}$ and the second peak quality frame $F_{p2}$ using a motion compensation subnet in the multi-frame convolutional neural network structure to obtain a first compensated peak quality frame $F'_{p1}$ and a second compensated peak quality frame $F'_{p2}$;

perform quality enhancement on the current frame using a quality enhancement subnet in the multi-frame convolutional neural network structure; and     output, by the quality enhancement subnet, a quality enhanced frame representing the current frame with enhanced quality, wherein the quality enhanced frame is represented as $F_{np}+R_{np}(\theta_{qe})$, wherein $F_{np}$ represents the current frame, and wherein $R_{np}(\theta_{qe})$ represents a residual reconstructed according to a trainable parameter.

19. The non-transitory computer storage medium of claim 18, wherein the multi-frame convolutional neural network structure comprises: the motion compensation subnet configured to compensate temporal motion between adjacent frames and the quality enhancement subnet configured to fuse features of temporal-motion-compensated frames produced by the motion compensation subnet.

20. The non-transitory computer storage medium of claim 19, wherein the processor is further to:

train the motion compensation subnet and the quality enhancement subnet in the multi-frame convolutional neural network structure before inputting the current frame, the first peak quality frame $F_{p1}$, and the second peak quality frame $F_{p2}$ into the multi-frame convolutional neural network structure.

\* \* \* \* \*